US012719124B2

(12) United States Patent
Oide et al.

(10) Patent No.: US 12,719,124 B2
(45) Date of Patent: Aug. 25, 2026

(54) POWER STORAGE DEVICE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Ryuji Oide, Kariya (JP); Hiromi Ueda, Kariya (JP); Takeyuki Kato, Kariya (JP); Satoshi Morioka, Okazaki (JP); Motoyoshi Okumura, Nagoya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 438 days.

(21) Appl. No.: 18/285,081

(22) PCT Filed: Mar. 23, 2022

(86) PCT No.: PCT/JP2022/013708

§ 371 (c)(1),
(2) Date: Sep. 29, 2023

(87) PCT Pub. No.: WO2022/230469

PCT Pub. Date: Nov. 3, 2022

(65) Prior Publication Data

US 2024/0194998 A1 Jun. 13, 2024

(30) Foreign Application Priority Data

Apr. 30, 2021 (JP) ................................ 2021-077464

(51) Int. Cl.
*H01M 50/242* (2021.01)
*H01G 11/10* (2013.01)
(Continued)

(52) U.S. Cl.
CPC .......... *H01M 50/242* (2021.01); *H01G 11/10* (2013.01); *H01G 11/72* (2013.01); (Continued)

(58) Field of Classification Search
None
See application file for complete search history.

(56) References Cited

U.S. PATENT DOCUMENTS

2013/0252063 A1 9/2013 Park

FOREIGN PATENT DOCUMENTS

CN 103325977 A 9/2013
JP 2018-006058 A 1/2018
(Continued)

OTHER PUBLICATIONS

International Preliminary Report on Patentability dated Oct. 24, 2023 with a Translation of the Written Opinion of the International Searching Authority in Application No. PCT/JP2022/013708.
(Continued)

*Primary Examiner* — Sean P Cullen
*Assistant Examiner* — Heng M. Chan
(74) *Attorney, Agent, or Firm* — Sughrue Mion, PLLC

(57) ABSTRACT

A power storage device includes a power storage module, a current collector plate, an insulating plate, and a restraint plate. The insulating plate and the restraint plate have different coefficients of thermal expansion. The insulating plate has a facing surface facing the restraint plate, and a first protruding portion provided on the facing surface in a position spaced from a center of the facing surface. The restraint plate is provided with a first hole portion into which the first protruding portion is inserted. The first protruding portion is divided into a first protrusion and a second protrusion in a second direction. The first protrusion is disposed closer to the center of the facing surface in the
(Continued)

second direction. The second protrusion is disposed closer to an outer edge of the facing surface in the second direction.

15 Claims, 12 Drawing Sheets

(51) Int. Cl.

| | |
|---|---|
| ***H01G 11/72*** | (2013.01) |
| ***H01M 50/258*** | (2021.01) |
| ***H01M 50/291*** | (2021.01) |
| ***H01M 50/293*** | (2021.01) |
| ***H01M 50/503*** | (2021.01) |

(52) U.S. Cl.
CPC ....... *H01M 50/258* (2021.01); *H01M 50/291* (2021.01); *H01M 50/293* (2021.01); *H01M 50/503* (2021.01)

(56) References Cited

FOREIGN PATENT DOCUMENTS

| | | | | |
|---|---|---|---|---|
| JP | 2020119654 | A | * | 8/2020 |
| JP | 2021182465 | A | * | 11/2021 |

OTHER PUBLICATIONS

International Search Report for PCT/JP2022/013708 dated May 31, 2022.

Chinese Office Action issued on Mar. 25, 2026 in CN Patent Application No. 202280031420.9.

* cited by examiner 1
2
3
5A(5)
5B(5)
5C(5)
6
7
8A(4,8)
8B(4,8)
9(4)
9a
9b
10
10a
10b
10c
11
11a
11b
20A(20)
20B(20)
20a
D1
D2

10a
10
30
21
11a
D2
11
73
71
20B
30
22
10a
72
30
10
8B
70
70
20a
70
30
70
D3
21
22
D1

POWER STORAGE DEVICE

This Application is a National Stage of Application No. PCT/JP2022/013708 filed Mar. 23, 2022, claiming priority based on Japanese Patent Application No. 2021-077464 filed Apr. 30, 2021.

TECHNICAL FIELD

The present disclosure relates to a power storage device.

BACKGROUND ART

A power storage device is known that includes a power storage module, a current collector plate stacked on the power storage module, an insulating plate stacked on the current collector plate, and a restraint plate stacked on the insulating plate (see Patent Literature 1).

CITATION LIST

Patent Literature

Patent Literature 1: Japanese Unexamined Patent Publication No. 2018-6058

SUMMARY OF INVENTION

Technical Problem

In a power storage device in which a plurality of modules are stacked, for example, a protruding portion may be provided on the insulating plate, and a hole portion into which the protruding portion is inserted may be provided in the restraint plate in order to position the insulating plate relative to the restraint plate. However, due to the difference in the coefficient of thermal expansion in the planar direction of the insulating plate and the restraint plate, the protruding portion may interfere with the hole portion and stress may concentrate on the base of the protruding portion, thereby causing cracks in the insulating plate in the thickness direction. This may cause poor insulation.

An object of the present disclosure is to provide a power storage device that enables an insulating plate to be positioned relative to a restraint plate, and enables poor insulation of the insulating plate to be suppressed.

Solution to Problem

A power storage device according one aspect of the present disclosure includes: a power storage module; a current collector plate stacked on the power storage module in a first direction, and electrically connected to the power storage module; an insulating plate stacked on the current collector plate in the first direction; and a restraint plate stacked on the insulating plate in the first direction, and applying a restraint load on the power storage module, the current collector plate, and the insulating plate, wherein the insulating plate and the restraint plate have different coefficients of thermal expansion, wherein the insulating plate has a facing surface facing the restraint plate, and a first protruding portion provided on the facing surface in a position spaced from a center of the facing surface, wherein the restraint plate is provided with a first hole portion into which the first protruding portion is inserted, wherein the first protruding portion is divided into a first protrusion and a second protrusion in a second direction intersecting the first direction, wherein the first protrusion is disposed closer to the center of the facing surface in the second direction, and wherein the second protrusion is disposed closer to an outer edge of the facing surface in the second direction.

In the power storage device above, the insulating plate is provided with the first protruding portion, and the restraint plate is provided with the first hole portion. The insulating plate can thus be positioned relative to the restraint plate by inserting the first protruding portion of the insulating plate into the first hole portion of the restraint plate. The insulating plate and the restraint plate have different coefficients of thermal expansion. Additionally, the first protruding portion is provided in a position spaced from the center of the facing surface of the insulating plate. Thus, when the insulating plate and the restraint plate thermally expand and thermally contract, the first protruding portion moves in a direction toward or away from the center of the facing surface relative to the first hole portion. Consequently, the first protruding portion interferes with the first hole portion, and stress concentrates on a base of the first protruding portion. The first protruding portion is divided into the first protrusion and the second protrusion in the second direction intersecting the first direction, the first protrusion is disposed closer to the center of the facing surface, and the second protrusion is disposed closer to the outer edge of the facing surface. A rigidity of each of the first protrusion and the second protrusion is less than a rigidity of an undivided first protruding portion. Thus, even when the first protruding portion interferes with the first hole portion, only one of the first protrusion and the second protrusion interferes with the first hole portion, and easily breaks at the base. This suppresses formation of cracks in the insulating plate in the thickness direction. As a result, poor insulation of the insulating plate can be suppressed.

The insulating plate may be made of a resin, may have a coefficient of thermal expansion higher than a coefficient of thermal expansion of the restraint plate, and the first protrusion may abut against an inner wall of the first hole portion. In this case, since the insulating plate is made of a resin, the lower the temperature, the more fragile it becomes. Thus, cracks tend to form in the insulating plate especially during thermal contraction. Additionally, since the coefficient of thermal expansion of the insulating plate is higher than the coefficient of thermal expansion of the restraint plate, when the insulating plate and the restraint plate thermally contract, the first protruding portion moves in a direction toward the center of the facing surface relative to the first hole portion. The first protrusion disposed closer to the center of the facing surface abuts against the inner wall of the first hole portion, so that only the first protrusion easily breaks at the base by the movement of the first protruding portion due to the thermal contraction. This suppresses the formation of cracks in the insulating plate in the thickness direction. As a result, poor insulation of the insulating plate can be suppressed.

The rigidity of the first protrusion may be lower than the rigidity of the second protrusion. In this case, the configuration in which the first protrusion easily breaks at the base can be achieved more easily compared to a case in which the rigidity of the first protrusion is greater than or equal to the rigidity of the second protrusion.

The facing surface may have a rectangular shape having a pair of shorts sides along the second direction, and a pair of long sides along a third direction intersecting the first direction and the second direction, and the first hole portion may be an elongated hole extending in the third direction. In this case, since the facing surface has a rectangular shape, dimensional tolerance between the insulating plate and the restraint plate in the third direction, which is a long-side direction, tend to be large. The first hole portion is an elongated hole extending in the third direction, so that even in the case in which the dimensional tolerance between the insulating plate and the restraint plate in the third direction is large, the first protruding portion can be reliably inserted into the first hole portion.

The first protruding portion may be provided in a position spaced from the center of the facing surface in the second direction. In this case, a direction of movement of the first protruding portion relative to the first hole portion is a direction intersecting the third direction. Thus, the first protruding portion tends to interfere with the first hole portion that extends in the third direction compared to a case in which the first protruding portion is positioned in the center of the facing surface in the second direction and the direction of movement is coincident with the third direction. Consequently, the configuration which suppresses the formation of cracks in the insulating plate in the thickness direction is particularly effective.

A plurality of the first protruding portions may be arranged along each of the pair of long sides. In this case, the insulating plate can be more accurately positioned relative to the restraint plate.

A thickness of the insulating plate may be less than a height of the first protruding portion. In this case, since the insulating plate is thin, the configuration which suppresses the formation of cracks in the insulating plate in the thickness direction is particularly effective.

Each of the first protrusion and the second protrusion may abut against an inner wall of the first hole portion. In this case, the insulating plate can be more accurately positioned relative to the restraint plate.

The coefficient of thermal expansion of the insulating plate may be greater than or equal to two times the coefficient of thermal expansion of the restraint plate. In this case, since there is a large difference in the coefficient of thermal expansion, the amount of movement of the first protruding portion relative to the first hole portion is large. Consequently, the configuration which suppresses the formation of cracks in the insulating plate in the thickness direction is particularly effective.

The first protruding portion may be divided into the first protrusion and the second protrusion by a slit. In this case, since the first protrusion and the second protrusion are spaced from each other, when one of the first protrusion and the second protrusion breaks at the base, impact on the other is suppressed.

Each of the first protrusion and the second protrusion may be divided into a pair of protrusion pieces in a third direction intersecting the first direction and second direction. In this case, a rigidity of each protrusion piece is less than the rigidity of each of the first protrusion and the second protrusion. Thus, even when the first protruding portion interferes with the first hole portion, the pair of protrusion pieces forming the first protrusion or the second protrusion easily break at the base. This further suppresses the formation of cracks in the insulating plate in the thickness direction. As a result, poor insulation of the insulating plate can be further suppressed.

The insulating plate may further have a second protruding portion provided on the facing surface closer to one end in the third direction than the first protruding portion, the restraint plate may be further provided with a second hole portion into which the second protruding portion is inserted, and the second protruding portion may be divided into a third protrusion and a fourth protrusion in the third direction. In this case, the second protruding portion is provided on the facing surface closer to the one end in the third direction than the first protruding portion. Thus, when attaching the insulating plate to the restraint plate, the first protruding portion can be easily inserted into the first hole portion by first inserting the second protruding portion into the second hole portion. A rigidity of each of the third protrusion and the fourth protrusion is less than a rigidity of an undivided second protruding portion. Thus, even when the insulating plate and the restraint plate thermally expand and thermally contract as described above, and the second protruding portion interferes with the second hole portion, only one of the third protrusion and the fourth protrusion interferes with the hole portion, and easily breaks at the base. This suppresses the formation of cracks in the insulating plate in the thickness direction. As a result, poor insulation of the insulating plate can be suppressed.

The third protrusion may be disposed closer to the center of the facing surface than the fourth protrusion, and may abut against an inner wall of the second hole portion. In this case, since the insulating plate is made of a resin, the lower the temperature, the more fragile it becomes as mentioned above. Thus, cracks tend to form in the insulating plate especially during thermal contraction. Additionally, since the coefficient of thermal expansion of the insulating plate is higher than the coefficient of thermal expansion of the restraint plate, when the insulating plate and the restraint plate thermally contract, the second protruding portion moves in the direction toward the center of the facing surface relative to the second hole portion. The third protrusion disposed closer to the center of the facing surface abuts against the inner wall of the second hole portion, so that only the third protrusion easily breaks at the base by the movement of the second protruding portion due to the thermal contraction. This suppresses the formation of cracks in the insulating plate in the thickness direction. As a result, poor insulation of the insulating plate can be suppressed.

The rigidity of the third protrusion may be lower than the rigidity of the fourth protrusion. In this case, the configuration in which the third protrusion easily breaks at the base can be achieved more easily compared to a case in which the rigidity of the third protrusion is greater than or equal to the rigidity of the fourth protrusion.

A plurality of the second protruding portions may be arranged in the second direction. In this case, the insulating plate can be reliably positioned relative to the restraint plate by inserting the plurality of the second protruding portions into the corresponding second hole portions.

Advantageous Effects of Invention

The present disclosure provides a power storage device that enables an insulating plate to be positioned relative to a restraint plate, and enables poor insulation of the insulating plate to be suppressed.

DESCRIPTION OF EMBODIMENTS

Embodiments of the present invention will be described in detail below with reference to the accompanying drawings. Same reference signs are given to the same or similar elements in the description of the drawings, and redundant description will be omitted.

Figure 1:
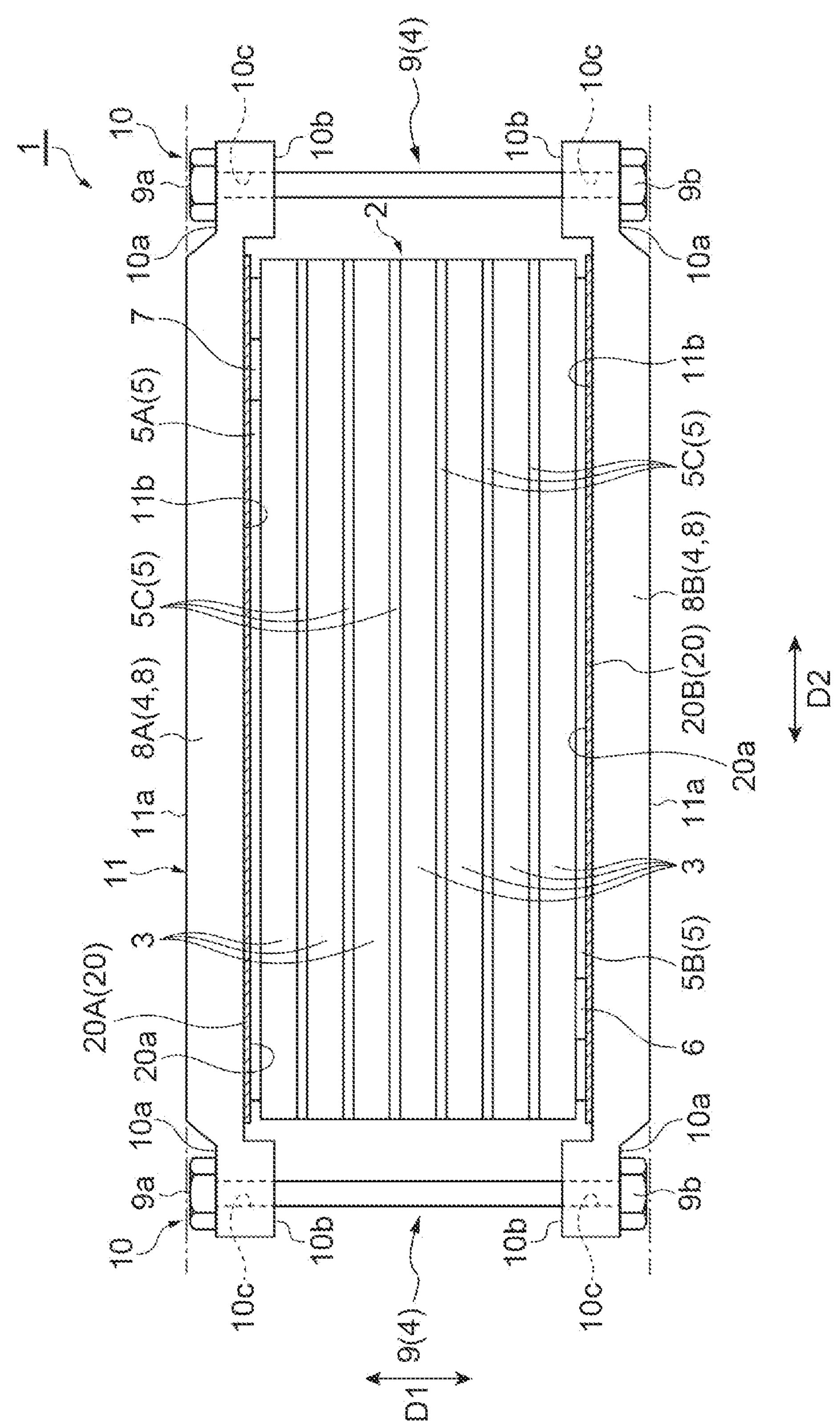
FIG. 1 is a perspective view of a power storage device according to an embodiment.

A power storage device 1 according to this embodiment will be described with reference to FIGS. 1 to 5. The power storage device 1 illustrated in FIG. 1 is, for example, used for the battery of various vehicles such as forklifts, hybrid vehicles, and electric vehicles. The power storage device 1 is a secondary battery such as a nickel-hydrogen secondary battery or a lithium-ion secondary battery. The power storage device 1 may, for example, be an electric double layer capacitor. This embodiment exemplifies a case in which the power storage device 1 is a nickel-hydrogen battery.

The power storage device 1 includes a module stack 2, a restraint member 4, and a pair of insulating plates 20. The module stack 2 includes a plurality of (in this embodiment seven) power storage modules 3 stacked in a first direction D1, and a plurality of (in this embodiment eight) current collector plates 5.

Figure 2:
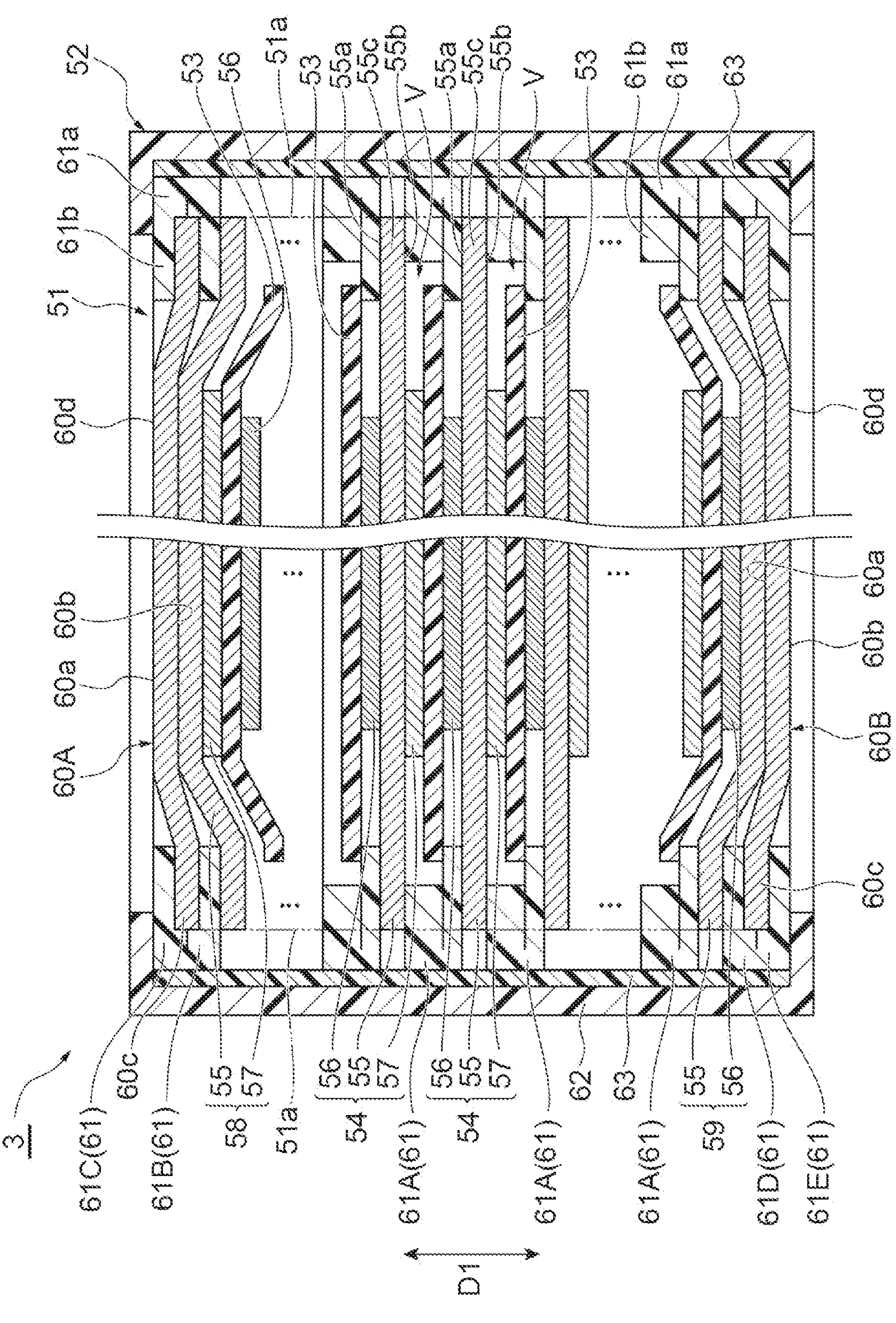
FIG. 2 A schematic cross-sectional view illustrating an inner configuration of a power storage module shown in FIG. 1.

As illustrated in FIG. 2, each power storage module 3 includes an electrode stack 51, and a resin sealing body 52 that seals the electrode stack 51. The power storage module 3 is formed, for example, in a rectangular parallelepiped shape.

The electrode stack 51 includes a plurality of electrodes which are stacked along a stacking direction (first direction D1) via separators 53, and metal plates 60A, 60B which are disposed on stack ends of the electrode stack 51. The plurality of electrodes include a stack of a plurality of bipolar electrodes 54, a negative termination electrode 58, and a positive termination electrode 59. The stack of the plurality of bipolar electrodes 54 is provided between the negative termination electrode 58 and the positive termination electrode 59.

Each bipolar electrode 54 includes a metal plate 55 which has one surface 55*a* and another surface 55*b* opposite the one surface 55*a*, a positive electrode 56 provided on the one surface 55*a*, and a negative electrode 57 provided on the other surface 55*b*. The positive electrode 56 is a positive electrode active material layer formed by coating the metal plate 55 with a positive electrode active material. The negative electrode 57 is a negative electrode active material layer formed by coating the metal plate 55 with a negative electrode active material. In the electrode stack 51, the positive electrode 56 of one bipolar electrode 54 faces the negative electrode 57 of another bipolar electrode 54 adjacent on one side in the first direction D1 with the separator 53 interposed therebetween. In the electrode stack 51, the negative electrode 57 of one bipolar electrode 54 faces the positive electrode 56 of another bipolar electrode 54 adjacent on the other side in the first direction D1 with the separator 53 interposed therebetween.

The negative termination electrode 58 has the metal plate 55 and the negative electrode 57 provided on the other surface 55*b* of the metal plate 55. The negative termination electrode 58 is disposed on one end side in the first direction D1 such that the other surface 55*b* faces the center of the electrode stack 51 in the first direction D1. The metal plate 60A is further stacked on the one surface 55*a* of the metal plate 55 of the negative termination electrode 58, and the power storage module 3 is electrically connected to one of the current collector plates 5 (see FIG. 1) adjacent to the power storage module 3 via the metal plate 60A. The negative electrode 57 provided on the other surface 55*b* of the metal plate 55 of the negative termination electrode 58 faces the positive electrode 56 of the bipolar electrode 54 on one end in the first direction D1 via the separator 53.

The positive termination electrode 59 has the metal plate 55 and the positive electrode 56 provided on the one surface 55*a* of the metal plate 55. The positive termination electrode 59 is disposed on the other end side in the first direction D1 such that the one surface 55*a* faces the center of the electrode stack 51 in the first direction D1. The metal plate 60B is further stacked on the other surface 55*b* of the metal plate 55 of the positive termination electrode 59, and the power storage module 3 is electrically connected to the other of the current collector plates 5 (see FIG. 1) adjacent to the power storage module 3 via the metal plate 60B. The positive electrode 56 provided on the one surface 55*a* of the metal plate 55 of the positive termination electrode 59 faces the negative electrode 57 of the bipolar electrode 54 on the other end in the first direction D1 via the separator 53.

The metal plate 55 is made of metal such as nickel or nickel plated steel plate. In one example, the metal plate 55 is a rectangular metal foil made of nickel. Each metal plate 55 is one of metal plates included in the electrode stack 51. An edge portion 55*c* of the metal plate 55 has a rectangular frame shape, and is an uncoated region not coated with a positive electrode active material and a negative electrode active material. An example of the positive electrode active material that forms the positive electrode 56 includes nickel hydroxide. An example of the negative electrode active material that forms the negative electrode 57 includes hydrogen storage alloy. In this embodiment, a forming region of the negative electrode 57 on the other surface 55*b* of the metal plate 55 is slightly larger than a forming region of the positive electrode 56 on the one surface 55*a* of the metal plate 55. The electrode stack 51 includes a plurality of the stacked metal plates 55, 60A, 60B.

The separator 53 is a member for preventing shorting between the metal plates 55, and is formed, for example, in a sheet shape. Examples of the separator 53 include a porous film made of a polyolefin resin such as polyethylene (PE) and polypropylene (PP), and woven or non-woven fabric made of polypropylene, methylcellulose, etc. The separator 53 may be reinforced with a vinylidene fluoride resin compound. It should be noted that the separator 53 is not limited to a sheet shape, and may be bag-shaped.

The metal plates 60A, 60B are substantially the same members as the metal plate 55, and is made of metal such as nickel or nickel plated steel plate. Each of the metal plates 60A, 60B is one of the metal plates included in the electrode stack 51. In one example, the metal plates 60A, 60B are rectangular metal foils made of nickel. The metal plates 60A, 60B are uncoated electrodes in which the one surfaces 60*a* and the other surfaces 60*b* are not coated with a positive electrode active material and a negative electrode active material. That is, the metal plates 60A, 60B are uncoated electrodes in which active material layers are not provided on either side.

The metal plate 60A is positioned at one stack end of the electrode stack 51. Due to the metal plate 60A, the negative termination electrode 58 is disposed between the metal plate 60A and the bipolar electrode 54 along the first direction D1. The metal plate 60B is positioned at the other stack end of the electrode stack 51. Due to the metal plate 60B, the positive termination electrode 59 is disposed between the metal plate 60B and the bipolar electrode 54 along the first direction D1. In the electrode stack 51, a center region of the electrode stack 51 (regions of the bipolar electrodes 54, the negative termination electrode 58, and the positive termination electrode 59 in which the active material layers are disposed) bulges in the first direction D1 compared to surrounding regions. Thus, in the metal plates 60A, 60B, center regions of the metal plates 60A, 60B are curved in a direction away from each other. The center regions of the one surface 60*a* of the metal plate 60A and the other surface 60*b* of the metal plate 60B abut against (are in contact with) the current collector plates 5. That is, the current collector plates 5 are disposed in contact with the metal plates 60A, 60B on the stack ends of the electrode stack 51.

The sealing body 52 is formed in a generally rectangular tubular shape that is made, for example, of an insulating resin. The sealing body 52 is provided so as to surround side surfaces 51*a* of the electrode stack 51. The sealing body 52 holds the edge portions 55*c* at the side surfaces 51*a*. The sealing body 52 has a plurality of frame-shaped first sealing portions 61 (resin portions) provided on edge portions of the metal plates included in the electrode stack 51 (that is, the edge portions 55*c* of the metal plates 55 and edge portions 60*c* of the metal plates 60A, 60B), and a second sealing portion 62 surrounding the first sealing portions 61 along the side surfaces 51*a* and bonded to the first sealing portions 61. The first sealing portions 61 and the second sealing portion 62 are, for example, an insulating resin having alkali resistance. Examples of the material for forming the first sealing portions 61 and the second sealing portion 62 include polypropylene (PP), polyphenylene sulfide (PPS), and modified polyphenylene ether (modified PPE).

The first sealing portion 61 is provided continuously along the entire peripheries of the edge portions 55*c* of the metal plates 55 or of the edge portions 60*c* of the metal plates 60A, 60B, and has a rectangular frame shape when viewed in the first direction D1. The first sealing portion 61 is welded and air-tightly joined to the edge portions 55*c* of the metal plates 55 or the edge portions 60*c* of the metal plates 60A, 60B, for example, by ultrasound or heat. The first sealing portion 61 extends outward of the edge portions 55*c* of the metal plates 55 or the edge portions 60*c* of the metal plates 60A, 60B when viewed in the first direction D1. The first sealing portion 61 includes an outer portion 61*a* that protrudes outward of edges of the metal plates 55 or the metal plates 60A, 60B, and an inner portion 61*b* that is positioned inward of the edges of the metal plates 55 or the metal plates 60A, 60B. A distal end portion (outer edge portion) of the outer portion 61*a* of the first sealing portion 61 is joined to the second sealing portion 62 by a weld layer 63. The weld layer 63 is formed by the distal end portions of the first sealing portions 61 being melted and bonded to each other, for example, by hot plate welding. The outer portions 61*a* of the first sealing portions 61 adjacent to each other in the first direction D1 may be separated from each other, or may be in contact with each other. Additionally, the outer portions 61*a* of the first sealing portions 61 adjacent to each other in the first direction D1 may be bonded to each other, for example, by hot plate welding.

The plurality of the first sealing portions 61 include a plurality of first sealing portions 61A provided on the bipolar electrodes 54 and the positive termination electrode 59, a first sealing portion 61B provided on the negative termination electrode 58, a first sealing portion 61C provided on the metal plate 60A, and first sealing portions 61D, 61E provided on the metal plate 60B.

The first sealing portions 61A are joined to the one surfaces 55*a* of the metal plates 55 of the bipolar electrodes 54 and the positive termination electrode 59. The inner portions 61*b* of the first sealing portions 61A are positioned between the edge portions 55*c* of the metal plates 55 adjacent to each other in the first direction D1. A region in which the edge portion 55*c* of the one surface 55*a* of the metal plate 55 overlaps the first sealing portion 61A is a bonding region between the metal plate 55 and the first sealing portion 61A.

In this embodiment, the first sealing portion 61A is formed in a two layer structure by a film being folded in two. The outer edge portion of the first sealing portion 61A embedded in the second sealing portion 62 is a folded portion (bent portion) of the film. A first film layer forming the first sealing portion 61A is joined to the one surface 55*a*. An inner edge of a second film layer is positioned outward of an inner edge of the first film layer, and forms a step portion on which the separator 53 is placed. The inner edge of the second film layer is positioned inward of an edge of the metal plate 55.

The first sealing portion 61B is joined to the one surface 55*a* of the metal plate 55 of the negative termination electrode 58. The inner portion 61*b* of the first sealing portion 61B is positioned between the edge portion 55*c* of the metal plate 55 of the negative termination electrode 58 and the edge portion 60*c* of the metal plate 60A adjacent to each other in the first direction D1. A region in which the edge portion 55*c* of the one surface 55*a* of the metal plate 55 overlaps the inner portion 61*b* of the first sealing portion 61B is a bonding region between the metal plate 55 and the first sealing portion 61B. The first sealing portion 61B is also joined to the other surface 60*b* of the metal plate 60A. A region in which the edge portion 60*c* of the other surface 60*b* of the metal plate 60A overlaps the first sealing portion 61B is a bonding region between the metal plate 60A and the first sealing portion 61B. In this embodiment, the first sealing portion 61B is also joined to the edge portion 60*c* of the other surface 60*b* of the metal plate 60A. It can be said that not only the negative termination electrode 58, but also the metal plate 60A is provided with the first sealing portion 61B.

The first sealing portion 61C is joined to the one surface 60*a* (outer surface) of the metal plate 60A. In this embodiment, the first sealing portion 61C is positioned on one endmost side in the first direction D1 among the plurality of the first sealing portions 61. A region in which the edge portion 60*c* of the one surface 60*a* of the metal plate 60A overlaps the first sealing portion 61C is a bonding region between the metal plate 60A and the first sealing portion 61C. The one surface 60*a* of the metal plate 60A has an exposed portion 60*d* that is exposed from the first sealing portion 61C. The current collector plate 5 is disposed abutting against (in contact with) the exposed portion 60*d.*

In this embodiment, the outer edge portions of the first sealing portions 61B, 61C embedded in the second sealing portion 62 are continuous with each other. That is, the first sealing portions 61B, 61C are formed by a film being folded in two with the edge portion 60*c* of the metal plate 60A being sandwiched therebetween. The outer edge portions of the first sealing portions 61B, 61C are a folded portion (bent portion) of the film. The film that forms the first sealing portions 61B, 61C is joined to the edge portion 60*c* on both the one surface 60*a* and the other surface 60*b* of the metal plate 60A. By joining both surfaces of the metal plate 60A to the first sealing portions 61B, 61C in this way, leakage of an electrolytic solution due to the so-called alkali creep phenomenon can be suppressed.

The first sealing portion 61D is joined to the one surface 60*a* of the metal plate 60B. The inner portion 61*b* of the first sealing portion 61D is positioned between the edge portion 55*c* of the metal plate 55 of the positive termination electrode 59 and the edge portion 60*c* of the metal plate 60B adjacent to each other in the first direction D1. A region in which the edge portion 60*c* of the one surface 60*a* of the metal plate 60B overlaps the first sealing portion 61D is a bonding region between the metal plate 60B and the first sealing portion 61D.

The first sealing portion 61E is disposed on the edge portion 60*c* of the other surface 60*b* (outer surface) of the metal plate 60B. In this embodiment, the first sealing portion 61E is positioned on the other endmost side in the first direction D1 among the plurality of the first sealing portions 61. Additionally, in this embodiment, the first sealing portion 61E is not joined to the metal plate 60B. The other surface 60*b* of the metal plate 60B has the exposed portion 60*d* that is exposed from the first sealing portion 61E. The current collector plate 5 is disposed abutting against (in contact with) the exposed portion 60*d.*

In this embodiment, the outer edge portions of the first sealing portions 61D, 61E embedded in the second sealing portion 62 are continuous with each other. That is, the first sealing portions 61D, 61E are formed by a film being folded in two with the edge portion 60*c* of the metal plate 60B being sandwiched therebetween. The outer edge portions of the first sealing portions 61D, 61E are a folded portion (bent portion) of the film. The film that forms the first sealing portions 61D, 61E is joined to the edge portion 60*c* on the one surface 60*a* of the metal plate 60B.

In the bonding regions, surfaces of the metal plates 55, 60A, 60B are roughened. The roughened region may be limited to the bonding regions, but in this embodiment, the entirety of the one surfaces 55*a* of the metal plates 55 are roughened. Additionally, the entirety of the one surface 60*a* and the other surface 60*b* of the metal plate 60A are roughened. Additionally, the entirety of the one surface 60*a* of the metal plate 60B is roughened.

Roughening may be achieved, for example, by forming a plurality of protrusions by electroplating. Due to the formation of the plurality of protrusions in the bonding region, molten resin penetrates into the spaces between the plurality of protrusions formed by the roughening at a joining interface with the first sealing portion 61 in the bonding region to provide an anchoring effect. Thus, bond strength between the metal plates 55, 60A, 60B and the first sealing portions 61 can be improved. The protrusions formed during roughening, for example, have a shape tapering outwardly from a base end toward a distal end. Thus, a cross-section between adjacent protrusions will have an undercut shape, making it possible to increase the anchoring effect.

The second sealing portion 62 is provided on an outer side of the electrode stack 51 and the first sealing portions 61 so as to surround the side surfaces 51*a* of the electrode stack 51, and forms an outer wall (casing) of the power storage module 3. The second sealing portion 62 is formed, for example, by injection molding of a resin, and extends along the entire length of the electrode stack 51 along the first direction D1. The second sealing portion 62 has a rectangular frame shape extending with the first direction D1 as an axial direction. The second sealing portion 62 is welded to outer surfaces of the first sealing portions 61, for example, by heat generated during ejection molding.

The sealing body 52 forms inner spaces V between adjacent electrodes, and seals the inner spaces V. More specifically, the second sealing portion 62 seals, together with the first sealing portions 61, spaces between the bipolar electrodes 54 adjacent to each other along the first direction D1, a space between the negative termination electrode 58 and the bipolar electrode 54 adjacent to each other along the first direction D1, and a space between the positive termination electrode 59 and the bipolar electrode 54 adjacent to each other along the first direction D1. Thus, the inner spaces V, each of which are airtightly partitioned, are formed between the adjacent bipolar electrodes 54 adjacent to each other, between the negative termination electrode 58 and the bipolar electrode 54, and between the positive termination electrode 59 and the bipolar electrode 54. An electrolytic solution (not shown) which includes an alkali solution such as a potassium hydroxide solution is contained in these inner spaces V. The separators 53, the positive electrodes 56, and the negative electrodes 57 are impregnated with the electrolytic solution. The sealing body 52 also seals a space between the metal plate 60A and the negative termination electrode 58, and a space between the metal plate 60B and the positive termination electrode 59.

The plurality of the power storage modules 3 are stacked via the current collector plates 5. The power storage modules 3 adjacent to each other in the first direction D1 are electrically connected via the current collector plate 5. The plurality of the current collector plates 5 include a current collector plate 5A on one end side in the first direction D1, a current collector plate 5B on another end side, and a plurality of (in this embodiment six) current collector plates 5C interposed between the power storage modules 3. The current collector plate 5C is provided between the power storage modules 3 adjacent to each other in the first direction D1. The current collector plate 5C is disposed in contact with the exposed portion 60*d* of the other surface 60*b* of the metal plate 60B and the exposed portion 60*d* of the one surface 60*a* of the metal plate 60A between the power storage modules 3 adjacent to each other in the first direction D1.

The current collector plates 5A, 5B are disposed so as to sandwich the plurality of the power storage modules 3 and the plurality of the current collector plates 5C on both sides in the first direction D1. The current collector plates 5A, 5B are stacked in the first direction D1 on the power storage modules 3 positioned at the stack ends among the plurality of the power storage modules 3. The current collector plate 5A is stacked, in the first direction D1, on the power storage module 3 positioned at one stack end, and is electrically connected to at least this power storage module 3. The current collector plate 5B is stacked, in the first direction D1, on the power storage module 3 positioned at the other stack end, and is electrically connected to at least this power storage module 3. A negative terminal 7 is connected to the one current collector plate 5A. A positive terminal 6 is connected to the other current collector plate 5B.

The restraint member 4 includes a pair of restraint plates 8 that sandwich the module stack 2 on both sides in the first direction D1, and a plurality of coupling members 9 that couple the pair of restraint plates 8. The pair of restraint plates 8 include a restraint plate 8A on the negative terminal 7 side and a restraint plate 8B on the positive terminal 6 side. The pair of restraint plates 8 are stacked on either side of the module stack 2 in the first direction D1 so as to sandwich the module stack 2. The coupling members 9 apply a restraint load on the module stack 2 from both sides in the first direction D1 via the pair of restraint plates 8. The plurality of the power storage modules 3 and the plurality of the current collector plates 5 are unitized as the module stack 2 by being clamped by the pair of restraint plates 8. In this embodiment, each coupling member 9 is formed by a bolt 9*a* and a nut 9*b*, which fasten the pair of restraint plates 8.

The pair of insulating plates 20 include an insulating plate 20A on the negative terminal 7 side and an insulating plate 20B on the positive terminal 6 side. The insulating plate 20A is provided between the current collector plate 5A and the restraint plate 8A. The insulating plate 20A is a member for ensuring insulation between the current collector plate 5A and the restraint plate 8A. The insulating plate 20A is in contact with the current collector plate 5A and the restraint plate 8A. The insulating plate 20A is stacked on the current collector plate 5A in the first direction D1. The insulating plate 20A is disposed so as to overlap the entire current collector plate 5A when viewed in the first direction D1. The restraint plate 8A is stacked on the insulating plate 20A in the first direction D1, and applies a restraint load on at least the power storage module 3 positioned at the one stack end, the current collector plate 5A, and the insulating plate 20A.

The insulating plate 20B is provided between the current collector plate 5B and the restraint plate 8B. The insulating plate 20B is a member for ensuring insulation between the current collector plate 5B and the restraint plate 8B. The insulating plate 20B is in contact with the current collector plate 5B and the restraint plate 8B. The insulating plate 20B is stacked on the current collector plate 5B in the first direction D1. The insulating plate 20B is disposed so as to overlap the entire current collector plate 5B when viewed in the first direction D1. The restraint plate 8B is stacked on the insulating plate 20B in the first direction D1, and applies a restraint load on at least the power storage module 3 positioned at the other stack end, the current collector plate 5B, and the insulating plate 20B.

The insulating plate 20 is formed of an insulating material. The insulating plate 20 is made, for example, of a resin such as polypropylene (PP). The insulating plate 20 has a coefficient of thermal expansion that is different from a coefficient of thermal expansion of the restraint plate 8. The insulating plate 20 has a coefficient of thermal expansion that is higher than the coefficient of thermal expansion of the restraint plate 8. The insulating plate 20 has a coefficient of thermal expansion that is greater than or equal to two times the coefficient of thermal expansion of the restraint plate 8. The insulating plate 20 may have a coefficient of thermal expansion that is greater than or equal to five times the coefficient of thermal expansion of the restraint plate 8.

Figure 3:
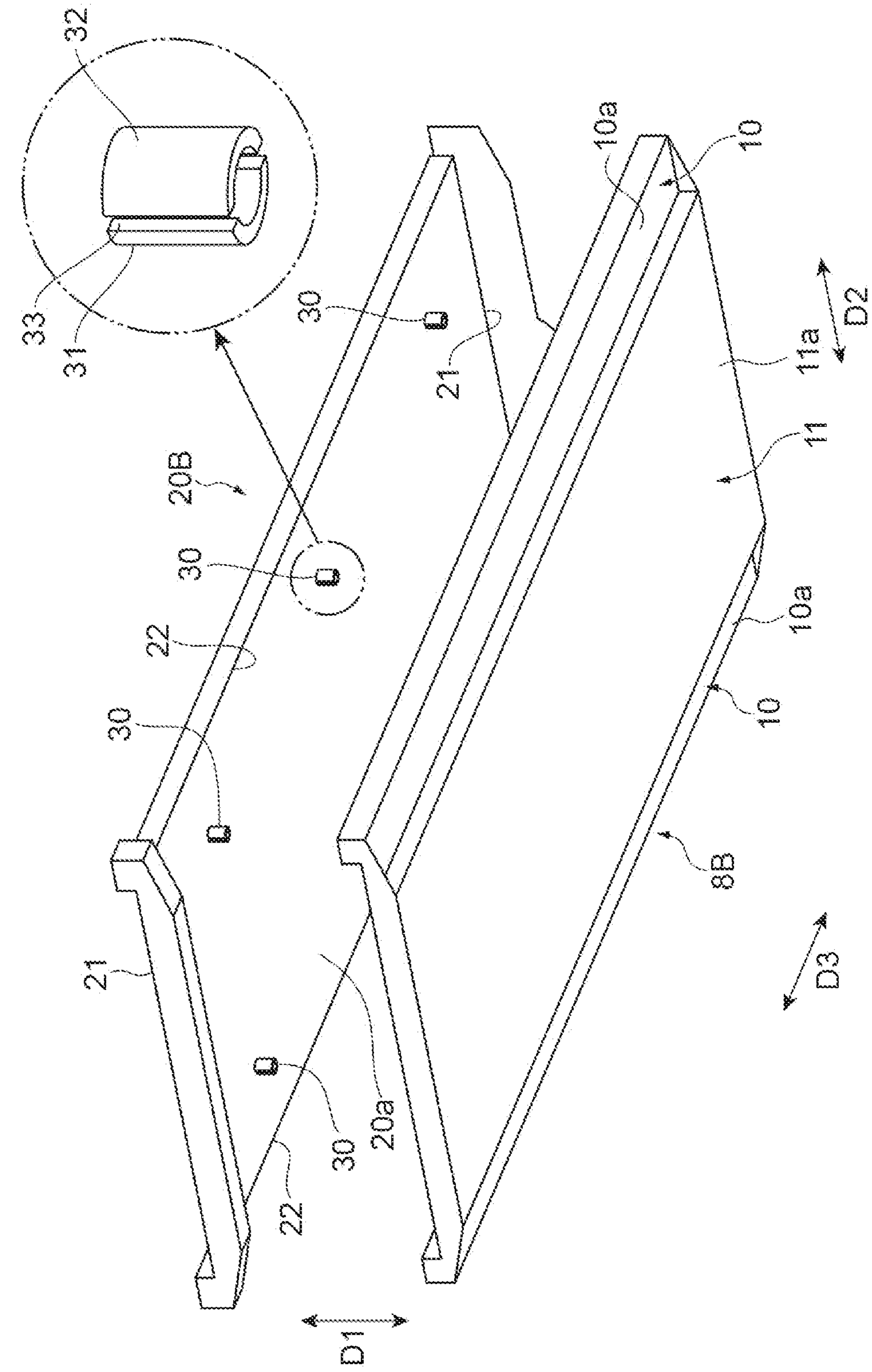
FIG. 3 is a developed perspective view illustrating the entire configuration of an insulating plate and a restraint plate.
Figure 4:
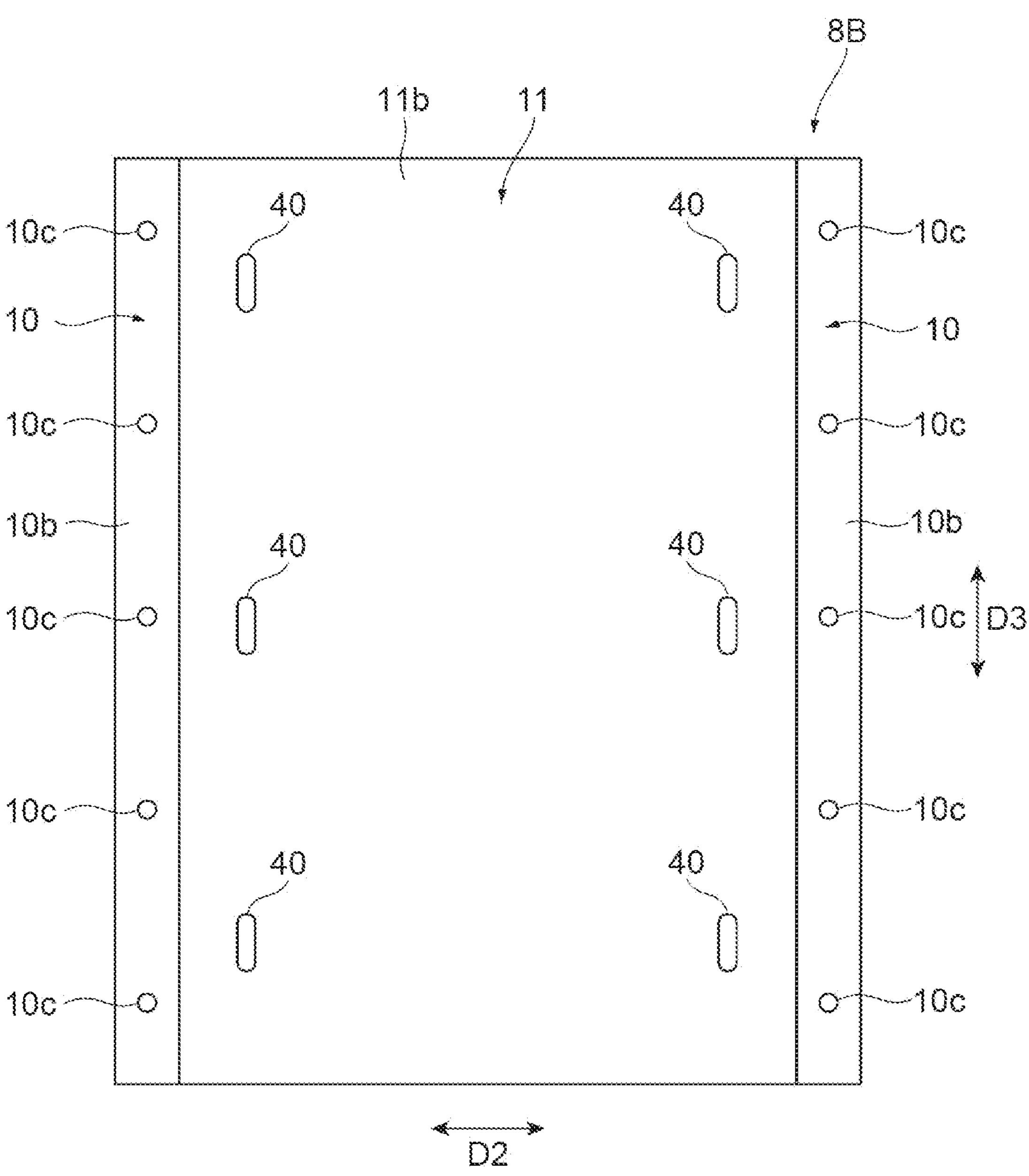
FIG. 4 is a plan view of the restraint plate seen from an inner surface side.
Figure 5:
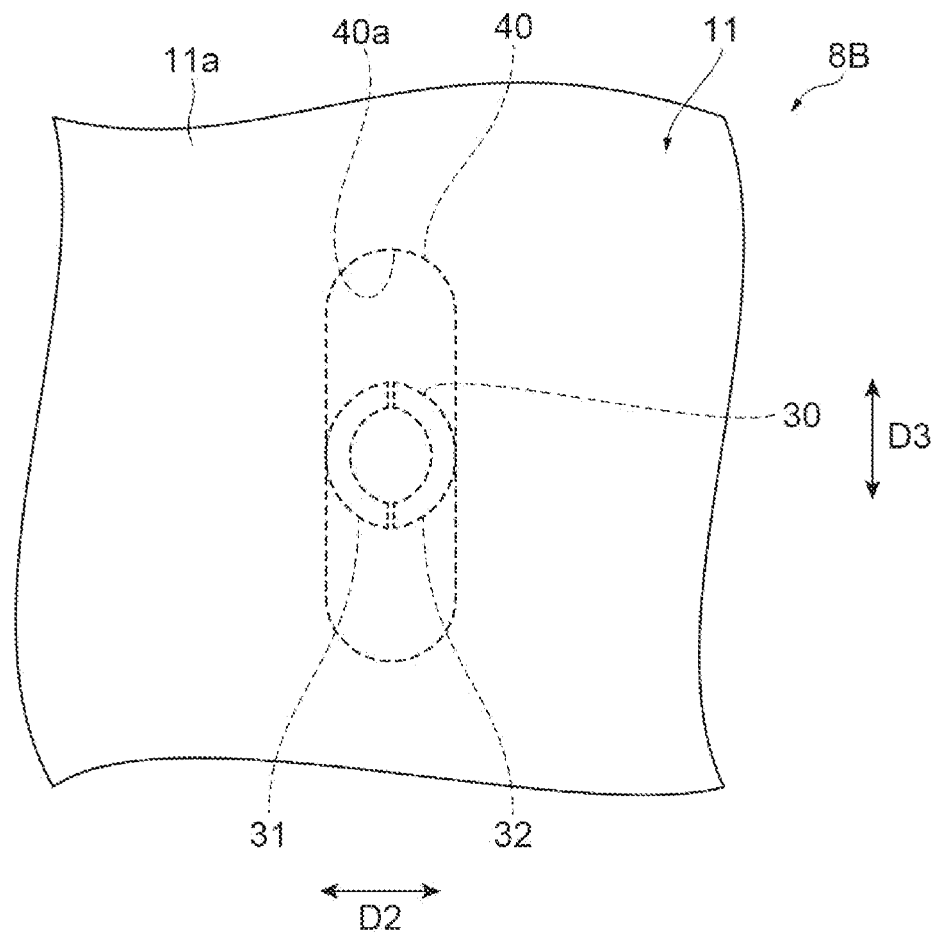
FIG. 5 is a partially enlarged plan view of the restraint plate seen from an outer surface side.

The configurations of the insulating plate 20 and the restraint plate 8 will next be further described with reference to FIGS. 1 to 5. FIG. 3 is a developed perspective view illustrating the entire configuration of the insulating plate 20B and the restraint plate 8B. FIG. 4 is a plan view of the restraint plate 8B seen from an inner surface 11*b* side. FIG. 5 is a partially enlarged plan view of the restraint plate 8B seen from an outer surface 11*a* side. Although the configurations of the insulating plate 20B and the restraint plate 8B on the positive terminal 6 side are described in FIGS. 3 to 5, it should be noted that the insulating plate 20A and the restraint plate 8A on the negative terminal 7 side also have similar configurations.

The insulating plate 20B has a facing surface 20*a* and a plurality of (in this embodiment six) protruding portions 30. The facing surface 20*a* faces the restraint plate 8B in the first direction D1. The facing surface 20*a* has a rectangular shape having a pair of short sides 21 and a pair of long sides 22. The pair of short sides 21 and the pair of long sides 22 form an outer edge of the facing surface 20*a*. A short side direction of the facing surface 20*a* is a second direction D2, and a long side direction of the facing surface 20*a* is a third direction D3. The first direction D1, the second direction D2, and the third direction D3 intersect with (in this embodiment, are perpendicular to) each other. The pair of short sides 21 face each other in the third direction D3. The pair of long sides 22 face each other in the second direction D2.

The plurality of protruding portions 30 are made of the same material as a body portion of the insulating plate 20B including the facing surface 20*a*, and are integrally formed with the body portion. The plurality of protruding portions 30 are provided in positions spaced from a center of the facing surface 20*a*, and protrude toward the restraint plate 8B. The insulating plate 20 and the restraint plate 8 thermally expand and thermally contract radially. The center of the facing surface 20*a* is a position to be the center when the insulating plate 20 thermally expands and thermally contracts in an in-plane direction, and is a position that does not move in the in-plane direction by the thermal expansion and the thermal contraction. The center of the facing surface 20*a* is, for example, a centroid of the facing surface 20*a*. The insulating plate 20B is thin, so that the thermal expansion and the thermal contraction in a thickness direction (first direction D1) is very small compared to the thermal expansion and the thermal contraction in the in-plane direction (second direction D2 and third direction D3) of the facing surface 20*a*.

The plurality of protruding portions 30 are arranged in two rows along each of the pair of long sides 22. The plurality of protruding portions 30 are provided in positions spaced from the center of the facing surface 20*a* in the short side direction (second direction D2). That is, the plurality of protruding portions 30 are provided in positions spaced from a center line on the facing surface 20*a* in the second direction D2. The center line on the facing surface 20*a* in the second direction D2 is a straight line parallel to the pair of long sides 22 and equally distanced from the pair of long sides 22. A plurality of the (in this embodiment three) protruding portions 30 disposed closer to one long side 22 of the facing surface 20*a* are arranged in the third direction D3 spaced from each other. A plurality of the (in this embodiment three) protruding portions 30 disposed closer to the other long side 22 of the facing surface 20*a* are arranged in the third direction D3 spaced from each other.

Each protruding portion 30 is divided into a first protrusion 31 and a second protrusion 32 in the in-plane direction of the facing surface 20*a*. In this embodiment, each protruding portion 30 is divided in the second direction D2. The first protrusion 31 is disposed closer to the center of the facing surface 20*a* in the second direction D2. The second protrusion 32 is disposed closer to the outer edge of the facing surface 20*a* in the second direction D2. In each protruding portion 30, the first protrusion 31 is disposed on an inner side of the facing surface 20*a* and the second protrusion 32 is disposed on an outer side (closer to the corresponding long side 22) of the facing surface 20*a* in the second direction D2.

The protruding portion 30 is divided into the first protrusion 31 and the second protrusion 32 by a slit 33. The slit 33 extends in the third direction D3. The slit 33 reaches the facing surface 20*a*. The first protrusion 31 and the second protrusion 32 are spaced from each other by the slit 33. The protruding portion 30 has a cylindrical shape that has a central axis along the first direction D1 and that is divided by the slit 33 that passes through the central axis. The first protrusion 31 and the second protrusion 32 are each in the form of a C-shaped column when viewed in the first direction D1. The first protrusion 31 and the second protrusion 32 have the same shape. The first protrusion 31 and the second protrusion 32 have the same rigidity.

A thickness of the insulating plate 20B is less than a height of the protruding portion 30 (protrusion height from the facing surface 20*a*), and is, for example, less than or equal to half the height of the protruding portion 30. The thickness of the insulating plate 20B is, for example, 2.0 mm. The height of the protruding portion 30 is, for example, 5 mm.

The restraint plate 8 is a rectangular metal plate having an area slightly larger than areas of the power storage module 3 and the current collector plate 5 when viewed in the first direction D1. A lateral direction of the restraint plate 8 is coincident with the second direction D2. A longitudinal direction of the restraint plate 8 is coincident with the third direction D3. The restraint plate 8 has a body portion 11 and a pair of edge portions 10. The body portion 11 overlaps the module stack 2 when viewed in the first direction D1. The pair of edge portions 10 extend from the body portion 11 in the second direction D2, and do not overlap the module stack 2 when viewed in the first direction D1. In this embodiment, the pair of edge portions 10 are provided on either side of the body portion 11 in the second direction D2. That is, the body portion 11 is interposed between the pair of edge portions 10 in the second direction D2.

Each edge portion 10 has an outer surface 10*a* facing outward in the first direction D1 (away from the power storage modules 3 in the first direction D1), and an inner surface 10*b* facing inward in the first direction D1 (toward the power storage modules 3 in the first direction D1). The body portion 11 has an outer surface 11*a* facing outward in the first direction D1, and an inner surface 11*b* facing inward in the first direction D1. The outer surface 10*a* is positioned inward of the outer surface 11*a* in the first direction D1. The inner surface 10*b* is positioned inward of the inner surface 11*b* in the first direction D1. The inner surface 11*b* faces the facing surface 20*a* of the insulating plate 20.

The pair of edge portions 10 are outer edge portions extending in the longitudinal direction (third direction D3) of the restraint plate 8. The edge portions 10 are provided with a plurality of through holes 10*c* into which the bolts 9*a* are inserted. It should be noted that the illustration of the through holes 10*c* is omitted in FIG. 3. As illustrated in FIG. 4, in each edge portion 10, the plurality of through holes 10*c* are disposed spaced from each other along the third direction D3. In this embodiment, the plurality of through holes 10*c* are disposed equidistant from each other from one end to the other end of the edge portion 10 in the longitudinal direction of the restraint plate 8. As illustrated in FIG. 1, a head portion of the bolt 9*a* is disposed on the outer surface 10*a* of the restraint plate 8A. A distal end portion (point) of a shaft portion of the bolt 9*a* protrudes from the outer surface 10*a* of the restraint plate 8B. The nut 9*b* is screwed onto the distal end portion of the bolt 9*a*. The nut 9*b* is disposed on the outer surface 10*a* of the restraint plate 8B.

As illustrated in FIGS. 4 and 5, the inner surface 11*b* of the restraint plate 8B is provided with a plurality of hole portions 40 into which the plurality of protruding portions 30 are inserted. One protruding portion 30, that is, one pair of the first protrusion 31 and the second protrusion 32, is inserted into one corresponding hole portion 40. A depth of the hole portion 40 is greater than the height of the protruding portion 30. The depth of the hole portion 40 is less than a thickness of the restraint plate 8B, and the hole portion 40 does not extend through the restraint plate 8B. The depth of the hole portion 40 is, for example, 10 mm. The thickness of the restraint plate 8B is, for example, 15 mm.

The hole portion 40 is an elongated hole extending in the third direction D3. A length of the hole portion 40 in the third direction D3 (length of the hole portion 40) is greater than a length of the hole portion 40 in the second direction D2 (width of the hole portion 40). The plurality of hole portions 40 have the same shape, but may have different shapes.

As illustrated in FIG. 5, the protruding portion 30 is, for example, inserted (press-fitted) into the hole portion 40 such that each of the first protrusion 31 and the second protrusion 32 abuts against an inner wall 40*a* of the hole portion 40. The protruding portion 30 is divided by the slit 33, and this facilitates the press-fitting into the hole portion 40. In FIG. 5, the hole portion 40 and the protruding portion 30 are shown in broken lines. The inner wall 40*a* has a pair of flat portions that face each other in the second direction D2 and abut against the first protrusion 31 and the second protrusion 32. The pair of flat portions clamp the first protrusion 31 or the second protrusion 32 in the second direction D2.

The first protrusion 31 and the second protrusion 32 are spaced from each other in the second direction D2 even when the protruding portion 30 is inserted into the hole portion 40. A gap of the slit 33 when the protruding portion 30 is inserted into the hole portion 40 is less than or equal to a gap of the slit 33 when the protruding portion 30 is not inserted into the hole portion 40. It is only required that the first protrusion 31 and the second protrusion 32 abut against the inner wall 40*a* at least when the insulating plate 20B and the restraint plate 8B thermally expand or thermally contract. In this embodiment, it is only required that at least the first protrusion 31 abuts against the inner wall 40*a*.

The operation and effect of the power storage device 1 according to this embodiment will next be described.

In the power storage device 1, the insulating plate 20 is provided with the protruding portion 30, and the restraint plate 8 is provided with the hole portion 40 into which the protruding portion 30 is inserted. The insulating plate 20 can thus be positioned relative to the restraint plate 8 by inserting the protruding portion 30 into the hole portion 40. The insulating plate 20 and the restraint plate 8 have different coefficients of thermal expansion. The insulating plate 20 thermally expands and thermally contracts radially from the center of the facing surface 20*a*. The protruding portion 30 is provided on the facing surface 20*a* in a position spaced from the center of the facing surface 20*a*. Thus, when the insulating plate 20 and the restraint plate 8 thermally expand and thermally contract, the protruding portion 30 move in the in-plane direction of the facing surface 20*a*, in a direction toward or away from the center of the facing surface 20*a* relative to the hole portion 40.

Figure 6A:
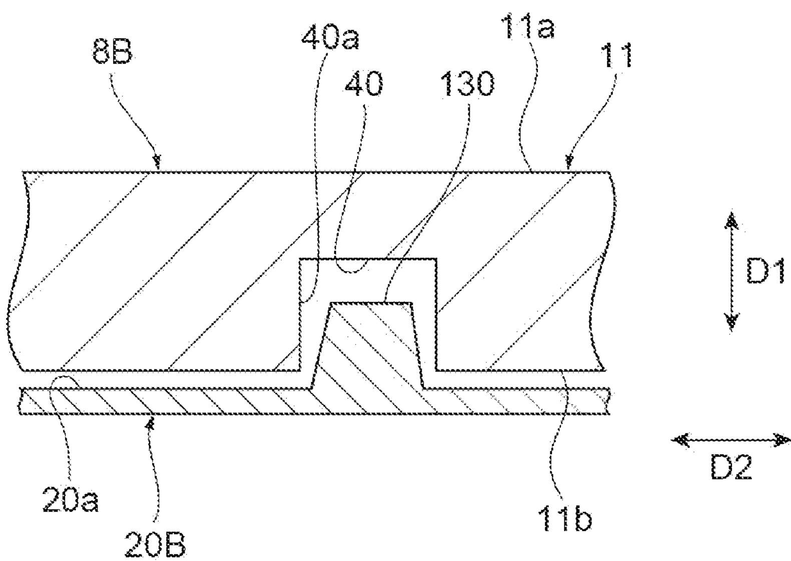
FIG. 6 (*a*) and FIG. 6 (*b*) shows cross-sectional views of an insulating plate and a restraint plate of a power storage device according to a comparative example.
Figure 6B:
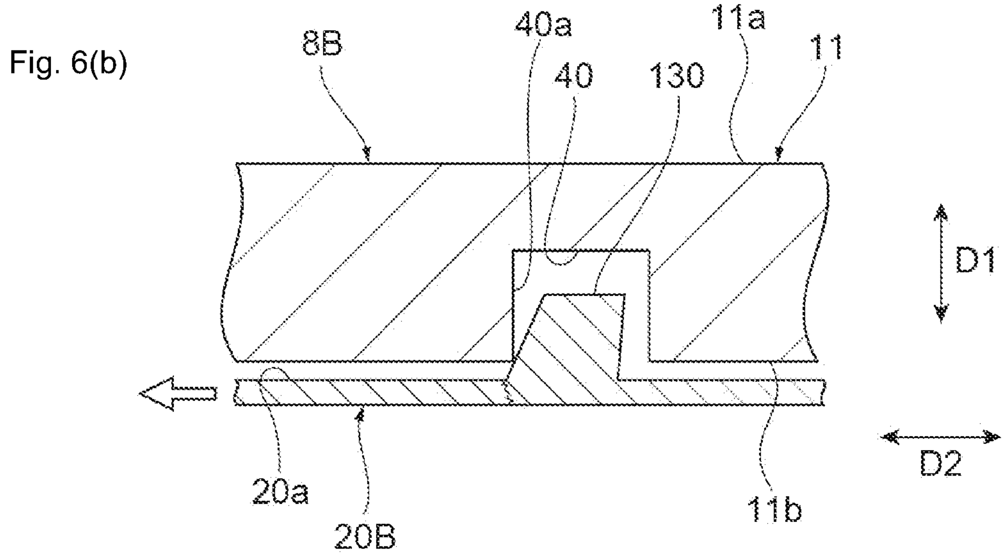
Figure 7A:
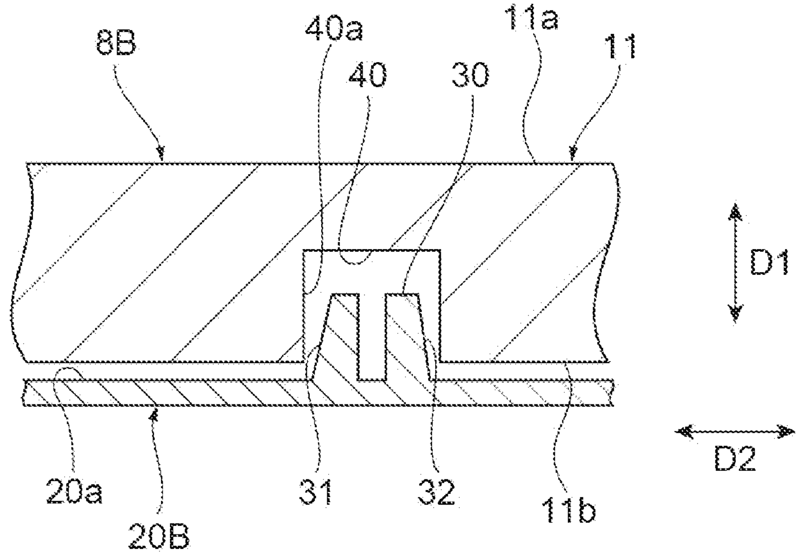
FIG. 7 (*a*) and FIG. 7 (*b*) shows cross-sectional views of the insulating plate and the restraint plate of the power storage device according to the embodiment.
Figure 7B:
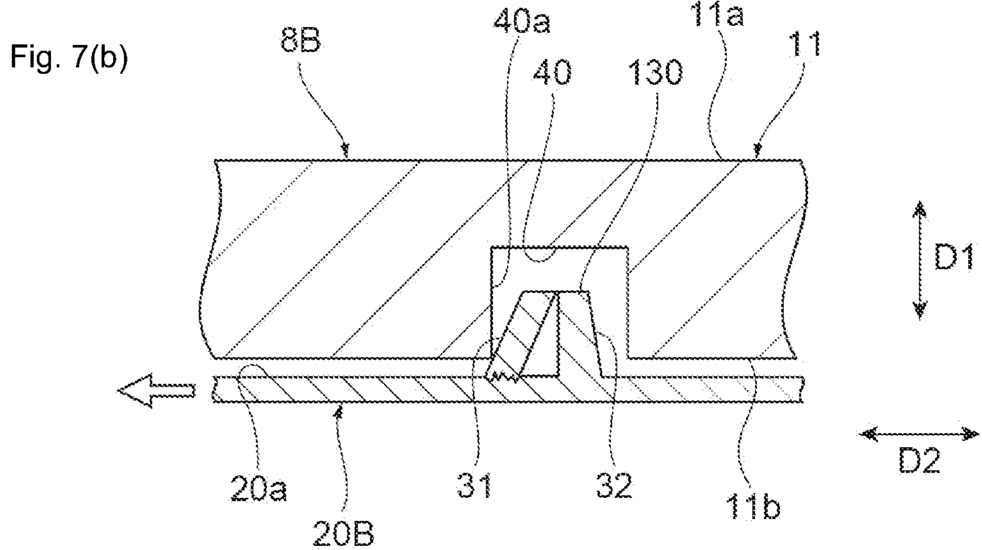

FIG. 6 shows cross-sectional views of the insulating plate 20B and the restraint plate 8B of a power storage device according to a comparative example. FIG. 7 shows cross-sectional views of the insulating plate 20B and the restraint plate 8B of the power storage device 1. Although the configurations of the insulating plate 20B and the restraint plate 8B on the positive terminal 6 side are described in FIGS. 6 and 7, the insulating plate 20A and the restraint plate 8A on the negative terminal 7 side also have similar configurations. Although in FIGS. 6 and 7, the facing surface 20*a* and the inner surface 11*b* are spaced from each other, they are actually in contact with each other.

The power storage device according to the comparative example illustrated in FIG. 6 is different from the power storage device 1 illustrated in FIG. 7 in that the insulating plate 20B has an undivided protruding portion 130. FIG. 6(*a*) illustrates the insulating plate 20B and the restraint plate 8B before they thermally expand or thermally contract. FIG. 6(*b*) illustrates the protruding portion 130 moving relative to the hole portion 40 when the insulating plate 20B and the restraint plate 8B thermally expand or thermally contract. In FIG. 6, the left side of the drawing is closer to the center of the facing surface 20*a*. In the power storage device according to the comparative example, the protruding portion 130 interferes with the inner wall 40*a* of the hole portion 40 by the movement of the protruding portion 130, and stress concentrates on the base of the protruding portion 130. The protruding portion 130 is thick and has a high rigidity, so that it does not tend to break at the base. As a result, cracks are formed in the insulating plate 20B in the thickness direction.

FIG. 7(*a*) illustrates the insulating plate 20B and the restraint plate 8B before they thermally expand or thermally contract. FIG. 7(*b*) illustrates the protruding portion 30 moving relative to the hole portion 40 when the insulating plate 20B and the restraint plate 8B thermally expand or thermally contract. In the power storage device 1, the protruding portion 30 is divided into the first protrusion 31 and the second protrusion 32, with the first protrusion 31 being disposed closer to the center of the facing surface 20*a*, and the second protrusion 32 being disposed closer to the outer edge of the facing surface 20*a*. Each of the first protrusion 31 and the second protrusion 32 is thinner and has a lower rigidity than the undivided protruding portion 130. Thus, even when the protruding portion 30 interferes with the hole portion 40 by the movement of the protruding portion 30, only one of the first protrusion 31 and the second protrusion 32 interferes with the hole portion 40, and easily breaks at the base. Here, only the first protrusion 31 breaks at the base. This suppresses the formation of cracks in the insulating plate 20B in the thickness direction. As a result, poor insulation of the insulating plate 20B can be suppressed. Additionally, since the second protrusion 32 remains without braking after the first protrusion 31 breaks, the function of positioning the insulating plate 20B relative to the restraint plate 8B can be maintained by the second protrusion 32.

In the power storage device 1, since the insulating plate 20 is made of a resin, the lower the temperature, the more fragile it becomes. Thus, cracks tend to form in the insulating plate 20, particularly, during thermal contraction. The insulating plate 20 has a coefficient of thermal expansion that is higher than the coefficient of thermal expansion of the restraint plate 8. Consequently, when the insulating plate 20 and the restraint plate 8 thermally contract, the protruding portion 30 moves in the direction toward the center of the facing surface 20*a* relative to the hole portion 40. The first protrusion 31 disposed closer to the center of the facing surface 20*a* abuts against the inner wall 40*a* of the hole portion 40, so that only the first protrusion 31 easily breaks at the base by the movement of the protruding portion 30 due to the thermal contraction.

The facing surface 20*a* has a rectangular shape having the pair of short sides 21 along the second direction D2, and the pair of long sides 22 along the third direction D3. Thus, dimensional tolerance between the insulating plate 20 and the restraint plate 8 in the third direction D3, which is the longitudinal direction, tend to be large. The hole portion 40 is an elongated hole extending in the third direction D3, so that even in the case in which the dimensional tolerance between the insulating plate 20 and the restraint plate 8 in the third direction D3 is large, the protruding portion 30 can be reliably inserted into the hole portion 40. The length of the hole portion 40 may be set according to the dimensional tolerance between the insulating plate 20 and the restraint plate 8. The dimensional tolerance between the insulating plate 20 and the restraint plate 8 is, for example, 3 mm at most.

In a case in which the protruding portion 30 is provided in the center of the facing surface 20*a* in the second direction D2, a direction of movement of the protruding portion 30 relative to the hole portion 40 is coincident with the third direction D3 in which the hole portion 40, which is an elongated hole, extends. Thus, the protruding portion 30 does not tend to interfere with the hole portion 40 when the protruding portion 30 moves. However, in this embodiment, the protruding portion 30 is provided in a position spaced from the center of the facing surface 20*a* in the second direction D2. Consequently, the direction of movement of the protruding portion 30 relative to the hole portion 40 is the in-plane direction of the facing surface 20*a*, and a direction intersecting the third direction D3. The protruding portion 30 thus tends to interfere with the hole portion 40. Accordingly, the configuration of this embodiment which suppresses the formation of cracks in the insulating plate 20 in the thickness direction is particularly effective.

The plurality of protruding portions 30 are arranged along each of the pair of long sides 22. The insulating plate 20 can thus be more accurately positioned relative to the restraint plate 8.

The thickness of the insulating plate 20 is less than the height of the protruding portion 30. Thus, since the insulating plate 20 is thin, the configuration of this embodiment which suppresses the formation of cracks in the insulating plate 20 in the thickness direction is particularly effective.

Each of the first protrusion 31 and the second protrusion 32 abuts against the inner wall 40*a* of the hole portion 40. The insulating plate 20 can thus be more accurately positioned relative to the restraint plate 8.

The insulating plate 20 has a coefficient of thermal expansion that is greater than or equal to two times the coefficient of thermal expansion of the restraint plate 8. Thus, since there is a large difference in the coefficient of thermal expansion, the amount of movement of the protruding portion 30 relative to the hole portion 40 is large. Consequently, the configuration of this embodiment which suppresses the formation of cracks in the insulating plate 20 in the thickness direction is particularly effective.

The protruding portion 30 is divided into the first protrusion 31 and the second protrusion 32 by the slit 33. Thus, since the first protrusion 31 and the second protrusion 32 are spaced from each other by the slit 33, when one of the first protrusion 31 and the second protrusion 32 breaks at the base, impact on the other is suppressed.

The present disclosure is not limited to the embodiments above.

Although in the embodiments above, the first protrusion 31 and the second protrusion 32 are in the form of a C-shaped column when viewed in the first direction D1, the first protrusion 31 and the second protrusion 32 may have a semicircular, circular, or polygonal column shape when viewed in the first direction D1. The first protrusion 31 and the second protrusion 32 may have different shapes.

Although in the embodiments above, the first protrusion 31 and the second protrusion 32 have the same rigidity, the rigidity of the first protrusion 31 may be lower than the rigidity of the second protrusion 32. In this case, a configuration in which the first protrusion 31 easily breaks at the base can be achieved more easily compared to a case in which the rigidity of the first protrusion 31 is greater than or equal to the rigidity of the second protrusion 32.

Figure 8:
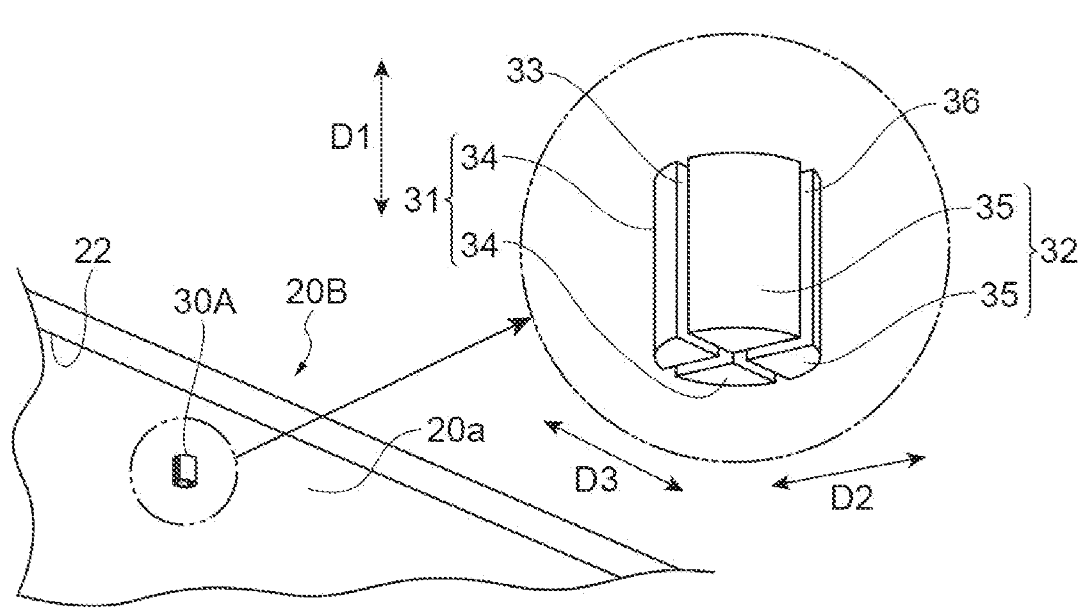
FIG. 8 is a perspective view of an insulating plate provided with a protruding portion according to a first variation.
Figure 9:
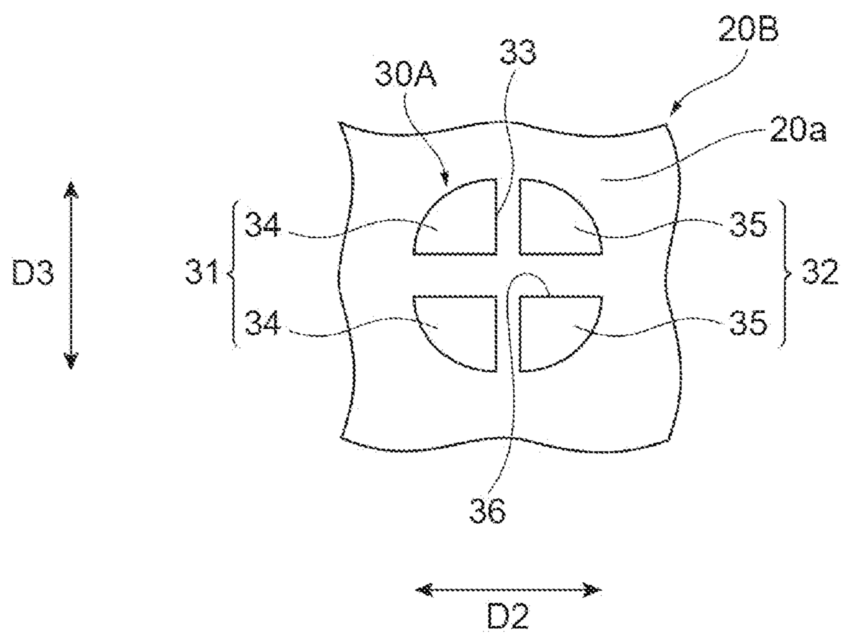
FIG. 9 is a plan view of the insulating plate provided with the protruding portion according to the first variation.

Although in the embodiments above, the protruding portion 30 is divided in two, into the first protrusion 31 and the second protrusion 32 in the second direction D2 by the slit 33, the protruding portion 30 may be further divided. FIG. 8 is a perspective view of the insulating plate 20B provided with a protruding portion 30A according to a first variation. FIG. 9 is a plan view of the insulating plate 20B provided with the protruding portion 30A according to the first variation. Although the configuration of the insulating plate 20B on the positive terminal 6 side is described in FIGS. 8 and 9, the insulating plate 20A on the negative terminal 7 side may also have a similar configuration. As illustrated in FIGS. 8 and 9, the protruding portion 30A may, for example, be divided into four by being further divided in the third direction D3. In this case, the protruding portion 30A includes four protrusions spaced from each other.

It can be said that the first protrusion 31 is divided into a pair of protrusion pieces 34 in the third direction D3. It can be said that the second protrusion 32 is divided into a pair of protrusion pieces 35 in the third direction D3. Each of the first protrusion 31 and the second protrusion 32 is divided in the third direction D3 by a slit 36 extending in the second direction D2. The slit 36 reaches the facing surface 20*a*. The pair of protrusion pieces 34 are spaced from each other by the slit 36. The pair of protrusion pieces 35 are spaced from each other by the slit 36. Each of the protrusion pieces 34, 35 may have a fan shape with a central angle of 90 degrees when viewed in the first direction D1. The four protrusion pieces 34, 35 have the same shape. Each of the protrusion pieces 34, 35 may, for example, have a circular or polygonal column shape when viewed in the first direction D1. The four protrusion pieces 34, 35 may have different shapes.

Figure 10:
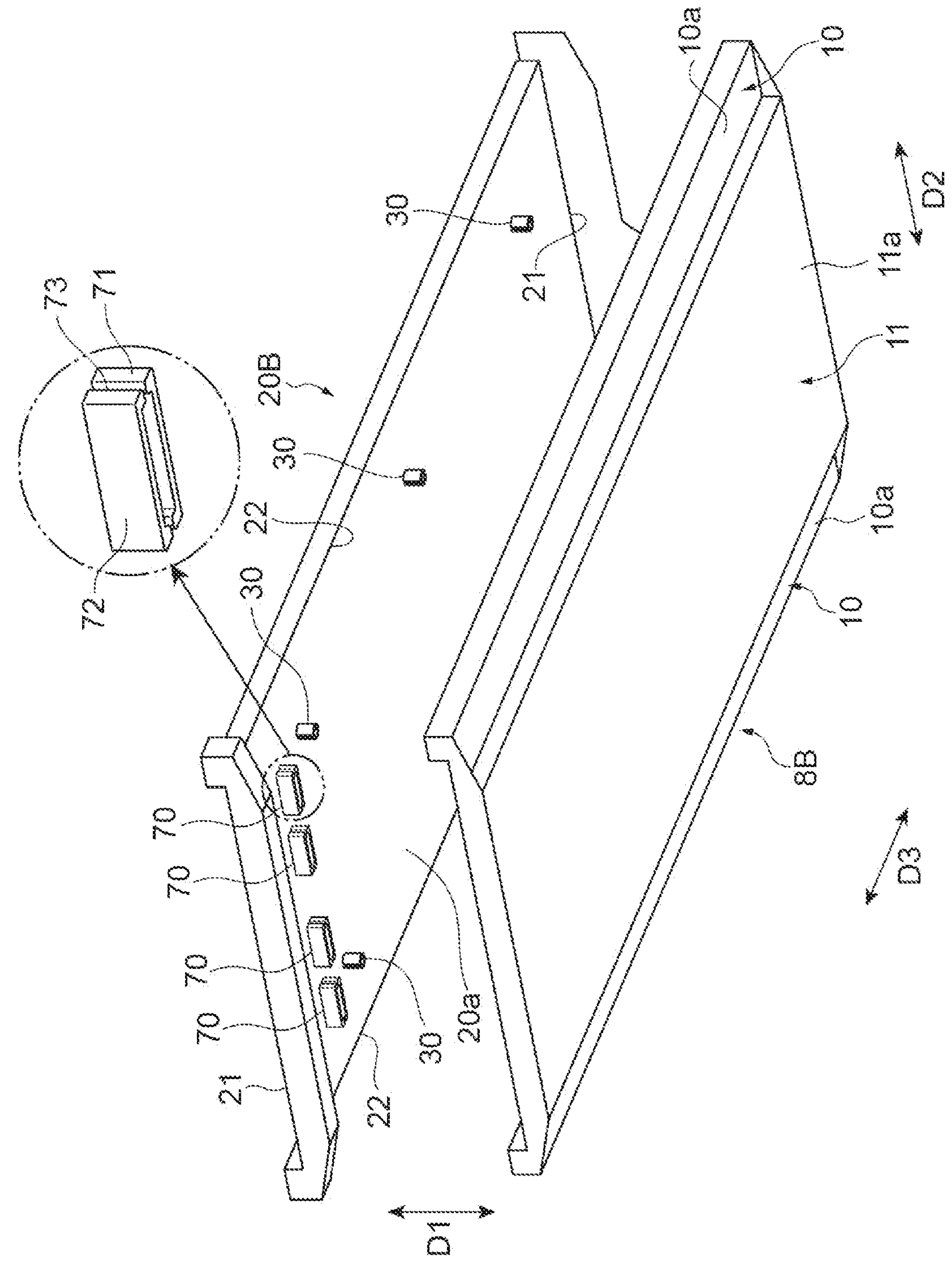
FIG. 10 is an exploded perspective view illustrating an entire configuration of an insulating plate provided with a protruding portion and a restraint plate according to a second variation.
Figure 11:
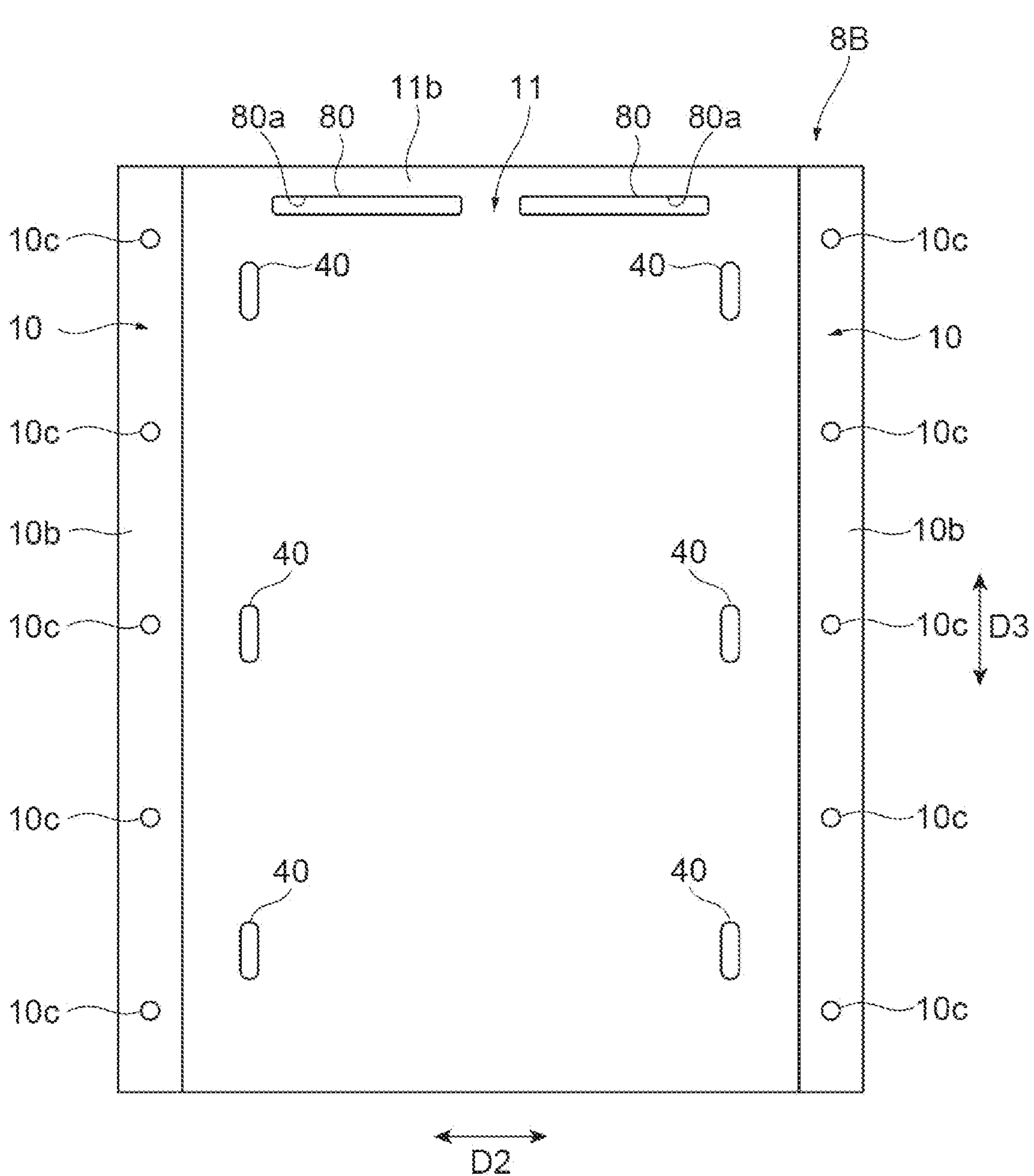
FIG. 11 is a plan view of the restraint plate according to the second variation seen from an inner surface side.

FIG. 10 is an exploded perspective view illustrating the entire configuration of the insulating plate 20B provided with a protruding portion 70 and the restraint plate 8B according to a second variation. FIG. 11 is a plan view of the restraint plate according to the second variation seen from an inner surface side. Although the configurations of the insulating plate 20B and the restraint plate 8B on the positive terminal 6 side are described in FIGS. 10 and 11, the insulating plate 20A and the restraint plate 8A on the negative terminal 7 side may also have similar configurations. As illustrated in FIGS. 10 and 11, the insulating plate 20B further has a plurality of the (in this variation four) protruding portions 70 provided on the facing surface 20*a*. The plurality of the protruding portions 70 have the same shape, but may have different shapes. The plurality of the protruding portions 70 are made of the same material as the body portion of the insulating plate 20B, and is integrally formed with the body portion. The plurality of the protruding portions 70 are provided in positions spaced from the center of the facing surface 20*a*, and protrude toward the restraint plate 8B. A height of the protruding portions 70 is, for example, the same as the height of the protruding portions 30.

The plurality of the protruding portions 70 are arranged in a row along one of the short sides 21. The plurality of the protruding portions 70 are provided in positions spaced from the center of the facing surface 20*a* in the long side direction (third direction D3). That is, the plurality of the protruding portions 70 are provided in positions spaced from a center line on the facing surface 20*a* in the third direction D3. The center line on the facing surface 20*a* in the third direction D3 is a straight line parallel to the pair of short sides 21 and equally distanced from the pair of short sides 21. The plurality of the protruding portions 70 are provided on the facing surface 20*a* closer to one end in the third direction D3 than the plurality of the protruding portions 30. The plurality of the protruding portions 70 are arranged in the second direction D2.

Each protruding portion 70 is divided into a first protrusion 71 and a second protrusion 72 in the in-plane direction of the facing surface 20*a*. Each protruding portion 70 is divided in the third direction D3. The first protrusion 71 is disposed closer to the center of the facing surface 20*a* in the third direction D3. The second protrusion 72 is disposed closer to the outer edge of the facing surface 20*a* in the third direction D3. In each protruding portion 70, the first protrusion 71 is disposed on the inner side of the facing surface 20*a* and the second protrusion 72 is disposed on the outer side (closer to one short side 21) of the facing surface 20*a* in the third direction D3.

The protruding portion 70 is divided into the first protrusion 71 and the second protrusion 72 by a slit 73 extending in the second direction D2. The slit 73 reaches the facing surface 20*a*. The first protrusion 71 and the second protrusion 72 are spaced from each other by the slit 73. The protruding portion 70 has a square tubular shape that is divided by the slit 73, and in which the first direction D1 is a height direction, the second direction D2 is the long side direction, and the third direction D3 is the short side direction. Each of the first protrusion 71 and the second protrusion 72 is in the form of a U-shaped column when viewed in the first direction D1. The first protrusion 71 and the second protrusion 72 have the same shape. The first protrusion 71 and the second protrusion 72 have the same rigidity.

The inner surface 11*b* of the restraint plate 8B is provided with a plurality of (in this variation two) hole portions 80 into which the plurality of the protruding portions 70 are inserted. Two protruding portions 70, that is, two pairs of the first protrusion 71 and the second protrusion 72, are inserted into one corresponding hole portion 80. One protruding portion 70 may be inserted into one corresponding hole portion 80, or all the protruding portions 70 may be inserted into one hole portion 80. A depth of the hole portion 80 is greater than the height of the protruding portion 3070. The depth of the hole portion 80 is less than the thickness of the restraint plate 8B, and the hole portion 80 does not extend through the restraint plate 8B. The depth of the hole portion 80 is the same as the depth of the hole portion 40.

The hole portion 80 is an elongated hole extending in the second direction D2. A length of the hole portion 80 in the second direction D2 (length of the hole portion 80) is greater than a length of the hole portion 80 in the third direction D3 (width of the hole portion 80). The plurality of hole portions 80 have the same shape, but may have different shapes.

The protruding portion 70 is, for example, inserted (press-fitted) into the hole portion 80 such that each of the first protrusion 71 and the second protrusion 72 abuts against an inner wall 80*a* of the hole portion 80. The protruding portion 70 is divided by the slit 73, and this facilitates the press-fitting into the hole portion 80. The inner wall 80*a* has a pair of flat portions that face each other in the third direction D3 and abut against the first protrusion 71 and the second protrusion 72. The pair of flat portions clamp the first protrusion 71 or the second protrusion 72 in the third direction D3.

The first protrusion 71 and the second protrusion 72 are spaced from each other in the third direction D3 even when the protruding portion 70 is inserted into the hole portion 80. A gap of the slit 73 when the protruding portion 70 is inserted into the hole portion 80 is less than or equal to a gap of the slit 73 when the protruding portion 70 is not inserted into the hole portion 80. It is only required that the first protrusion 71 and the second protrusion 72 abut against the inner wall 80*a* at least when the insulating plate 20B and the restraint plate 8B thermally expand or thermally contract. In this variation, it is only required that at least the first protrusion 71 abuts against the inner wall 80*a*.

The insulating plate 20B can also be positioned relative to the restraint plate 8B by inserting the protruding portion 70 into the hole portion 80 according to the second variation. In particular, the protruding portion 70 is provided on the facing surface 20*a* closer to the one end in the third direction D3 than the protruding portion 30. Thus, when attaching the insulating plate 20B to the restraint plate 8B, the protruding portion 30 can be easily inserted into the hole portion 40 by first inserting the protruding portion 70 into the hole portion 80. The plurality of the protruding portions 70 are arranged in the second direction D2. The insulating plate 20B can be reliably positioned relative to the restraint plate 8B by inserting the plurality of the protruding portions 70 into the corresponding hole portions 80.

The rigidity of each of the first protrusion 71 and the second protrusion 72 is less than the rigidity of an undivided protruding portion 70. Thus, even when the insulating plate 20B and the restraint plate 8B thermally expand and thermally contract as described above, and the protruding portion 70 interferes with the hole portion 80, only one of the first protrusion 71 and the second protrusion 72 interferes with the hole portion 80, and easily breaks at the base. This suppresses the formation of cracks in the insulating plate 20B in the thickness direction. As a result, poor insulation of the insulating plate 20B can be suppressed.

The first protrusion 71 is disposed closer to the center of the facing surface 20*a* than the second protrusion 72, and abuts against the inner wall 80*a* of the hole portion 80. Thus, only the first protrusion 71 breaks easily at the base when the insulating plate 20B and the restraint plate 8B thermally contract. This suppresses the formation of cracks in the insulating plate 20B in the thickness direction. As a result, poor insulation of the insulating plate 20B can be suppressed.

Although in the second variation above, the first protrusion 71 and the second protrusion 72 have the same rigidity, the rigidity of the first protrusion 71 may be lower than the rigidity of the second protrusion 72. In this case, a configuration in which the first protrusion 71 easily breaks at the base can be achieved more easily compared to a case in which the rigidity of the first protrusion 71 is greater than or equal to the rigidity of the second protrusion 72.

Figure 12:
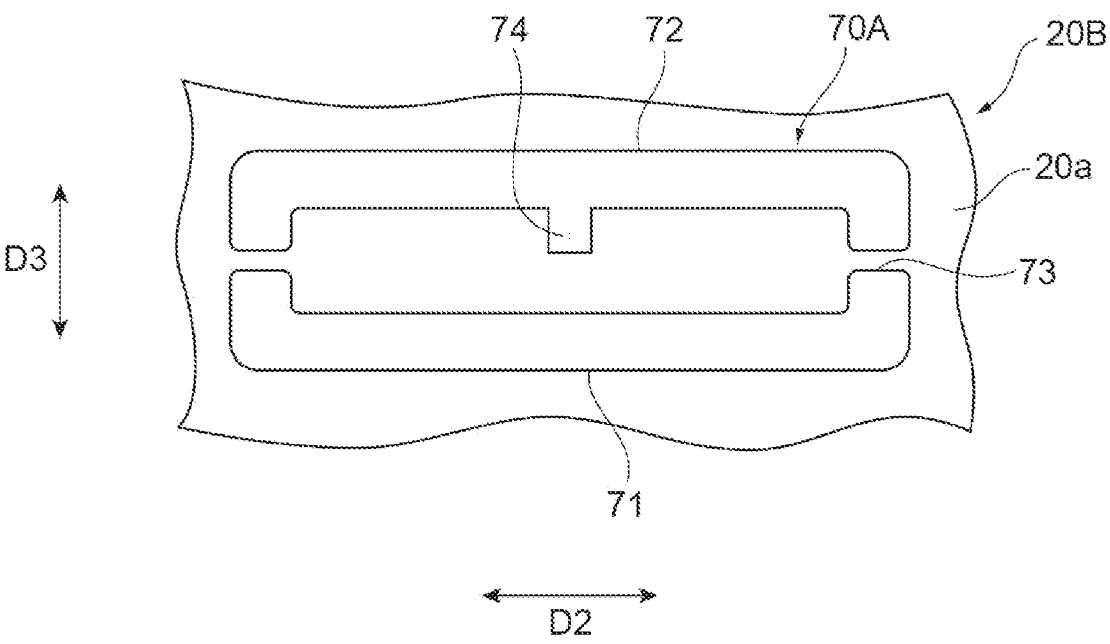
FIG. 12 is a plan view of an insulating plate provided with a protruding portion according to a third variation.

FIG. 12 is a plan view of the insulating plate 20B provided with a protruding portion 70A according to a third variation. Although the configuration of the insulating plate 20B on the positive terminal 6 side is described in FIG. 12, the insulating plate 20A on the negative terminal 7 side may also have a similar configuration. As illustrated in FIG. 12, in the protruding portion 70A, the second protrusion 72 has a rib 74. The rib 74 increases the rigidity of the second protrusion 72, and suppresses breakage of the second protrusion 72.

The embodiments and variations above may be combined as appropriate.

REFERENCE SIGNS LIST

1 . . . Power storage device, 3 . . . Power storage module, 5, 5A, 5B, 5C . . . Current collector plate, 8, 8A, 8B . . . Restraint plate, 20, 20A, 20B . . . Insulating plate, 20*a* . . . Facing surface, 21 . . . Short side, 22 . . . Long side, 30, 30A . . . Protruding portion, 31 . . . First protrusion, 32 . . . Second protrusion, 33 . . . Slit, 34, 35 . . . Protrusion piece, 36 . . . Slit, 40 . . . Hole portion, 40*a* . . . Inner wall, 70, 70A . . . Protruding portion, 71 . . . First protrusion, 72 . . . Second protrusion, 73 . . . Slit, 80 . . . Hole portion, 80*a* . . . Inner wall.

The invention claimed is:

1. A power storage device comprising:

a power storage module;

a current collector plate stacked on the power storage module in a first direction, and electrically connected to the power storage module;

an insulating plate stacked on the current collector plate in the first direction; and a restraint plate stacked on the insulating plate in the first direction, and applying a restraint load on the power storage module, the current collector plate, and the insulating plate, wherein the insulating plate and the restraint plate have different coefficients of thermal expansion, wherein the insulating plate has a facing surface facing the restraint plate, and a first protruding portion provided on the facing surface in a position spaced from a center of the facing surface, wherein the restraint plate is provided with a first hole portion into which the first protruding portion is inserted, wherein the first protruding portion is divided into a first protrusion and a second protrusion in a second direction intersecting the first direction, wherein the first protrusion is disposed closer to the center of the facing surface in the second direction, and wherein the second protrusion is disposed closer to an outer edge of the facing surface in the second direction.

2. The power storage device according to claim 1, wherein the insulating plate is made of a resin, and has a coefficient of thermal expansion higher than a coefficient of thermal expansion of the restraint plate, and wherein the first protrusion abuts against an inner wall of the first hole portion.

3. The power storage device according to claim 2, wherein a rigidity of the first protrusion is lower than a rigidity of the second protrusion.

4. The power storage device according to claim 1, wherein the facing surface has a rectangular shape having a pair of shorts sides along the second direction, and a pair of long sides along a third direction intersecting the first direction and the second direction, and wherein the first hole portion is an elongated hole extending in the third direction.

5. The power storage device according to claim 4, wherein the first protruding portion is provided in a position spaced from the center of the facing surface in the second direction.

6. The power storage device according to claim 4 or 5, wherein a plurality of the first protruding portions are arranged along each of the pair of long sides.

7. The power storage device according to claim 1, wherein a thickness of the insulating plate is less than a height of the first protruding portion.

8. The power storage device according to claim 1, wherein each of the first protrusion and the second protrusion abuts against an inner wall of the first hole portion.

9. The power storage device according to claim 1, wherein the coefficient of thermal expansion of the insulating plate is greater than or equal to two times the coefficient of thermal expansion of the restraint plate.

10. The power storage device according to claim 1, wherein the first protruding portion is divided into the first protrusion and the second protrusion by a slit.

11. The power storage device according to claim 1, wherein each of the first protrusion and the second protrusion is divided into a pair of protrusion pieces in a third direction intersecting the first direction and the second direction.

12. The power storage device according to claim 4, wherein the insulating plate further has a second protruding portion provided on the facing surface closer to one end in the third direction than the first protruding portion, wherein the restraint plate is further provided with a second hole portion into which the second protruding portion is inserted, and wherein the second protruding portion is divided into a third protrusion and a fourth protrusion in the third direction.

13. The power storage device according to claim 12, wherein the third protrusion is disposed closer to the center of the facing surface than the fourth protrusion, and abuts against an inner wall of the second hole portion.

14. The power storage device according to claim 13, wherein a rigidity of the third protrusion is lower than a rigidity of the fourth protrusion.

15. The power storage device according to claim 12, wherein a plurality of the second protruding portions are arranged in the second direction.

* * * * *